(12) United States Patent
Bohner et al.

(10) Patent No.: US 8,061,317 B2
(45) Date of Patent: Nov. 22, 2011

(54) CAM SHAFT PHASE SETTER AND VACUUM PUMP FOR AN INTERNAL COMBUSTION ENGINE

(75) Inventors: Jürgen Bohner, Bad Waldsee (DE); Claus Welte, Aulendorf (DE); Franz Maucher, Bad Waldsee (DE)

(73) Assignee: Schwabische Huttenwerke Automotive GmbH & Co. KG, Aalen-Wasseralfingen (DE)

( * ) Notice: Subject to any disclaimer, the term of this patent is extended or adjusted under 35 U.S.C. 154(b) by 686 days.

(21) Appl. No.: 12/109,729

(22) Filed: Apr. 25, 2008

(65) Prior Publication Data

US 2008/0283010 A1 Nov. 20, 2008

(51) Int. Cl.
F01L 1/34 (2006.01)
(52) U.S. Cl. .............. 123/90.17; 123/90.15; 123/90.31
(58) Field of Classification Search ............. 123/90.15, 123/90.17, 90.31
See application file for complete search history.

(56) References Cited

U.S. PATENT DOCUMENTS

| | | | |
|---|---|---|---|
| 4,537,164 A | 8/1985 | Ajiki et al. | |
| 4,858,572 A | 8/1989 | Shirai et al. | |
| 5,189,999 A | 3/1993 | Thoma | |
| 5,704,317 A | 1/1998 | Barth | |
| 5,988,126 A | 11/1999 | Strauss et al. | |
| 7,047,914 B2 | 5/2006 | Komorowski | |
| 7,051,690 B2 | 5/2006 | Dietz | |
| 2003/0062008 A1 | 4/2003 | Gramkow et al. | |
| 2005/0028773 A1 | 2/2005 | Komaki | |
| 2005/0166877 A1* | 8/2005 | Suga et al. ............. | 123/90.17 |
| 2005/0199201 A1 | 9/2005 | Schafer et al. | |
| 2005/0274345 A1 | 12/2005 | Dietz | |

FOREIGN PATENT DOCUMENTS

| | | |
|---|---|---|
| DE | 39 29 621 | 9/1991 |
| DE | 42 10 580 | 10/1993 |
| DE | 4210742 | 10/1993 |
| DE | 197 45 670 | 4/1999 |
| DE | 10296363 | 4/2004 |
| DE | 102 60 546 | 7/2004 |
| EP | 0 758 047 | 2/1997 |
| JP | 04303132 | 10/1992 |
| JP | 2000008987 | 1/2000 |

OTHER PUBLICATIONS

European Search Report for EP 10 16 3641 issued Aug. 4, 2010.

* cited by examiner

*Primary Examiner* — Zelalem Eshete
(74) *Attorney, Agent, or Firm* — RatnerPrestia

(57) ABSTRACT

A device for adjusting the phase position of a cam shaft of an internal combustion engine and for supplying an assembly with a partial vacuum, said device comprising: a phase setter for adjusting the phase position of the cam shaft relative to a crankshaft of the internal combustion engine; a vacuum pump for the assembly; and an attachment housing for the vacuum pump, wherein the attachment housing is mounted on the internal combustion engine and forms a housing or at least a housing cover for the phase setter.

40 Claims, 7 Drawing Sheets

CAM SHAFT PHASE SETTER AND VACUUM PUMP FOR AN INTERNAL COMBUSTION ENGINE

This application claims priority to German Utility Registration. No. 10 2007 020 431.2 filed Apr. 27, 2007, which is incorporated in its entirety by reference herein.

BACKGROUND OF THE INVENTION

1. Technical Field

The invention relates to a device comprising a cam shaft phase setter and a vacuum pump for mounting on an internal combustion engine, and also to an internal combustion engine with the device mounted.

2. Description of the Related Art

In order to reduce brake pedal forces in motor vehicles, in particular passenger cars and light-duty commercial vehicles, the vehicles are equipped with pneumatic brake servos. In conventional passenger car spark-ignition engines, the partial vacuums required for brake servos are applied by the suction pipe partial vacuums acting behind the suction inlet system throttle valve. In diesel engines and also modern spark-ignition engines with fuel injection, the suction pipe partial vacuums which arise during operation are in many cases not sufficient for powering the brake servos, because the load control deviates from conventional spark-ignition engines. Such internal combustion engines therefore use a separate vacuum pump which is driven by the respective engine. These pumps are generally driven by a cam shaft of the engine and are usually flange-mounted to a facing side of the cylinder head.

In order to increase the output and torque, and to reduce the emissions and fuel consumption, modern passenger car engines are increasingly equipped with cam shaft phase setters which are charged with engine oil pressure and using which the phase angle of an inlet cam shaft or outlet cam shaft or both cam shafts can be adjusted relative to an engine crankshaft. Usually, separate functional units of cam shaft phase setters and vacuum pumps are arranged on the cam shaft. Due to the required seal and coupling between the functional units and the respective drive, and as applicable between each other, and also in view of the configuration of the oil feed and oil eduction, such arrangements incur a comparatively elaborate construction. A direct coupling between the vacuum pump and a cam shaft also restricts the torque level and the arrangement of the vacuum pump.

DE 102 60 546 A1 discloses arranging a vacuum pump and a cam shaft phase setter coaxially next to each other on the same rotational axis. A rotor of the phase setter is placed, secured against rotating, on the cam shaft to be adjusted. The stator is driven by the crankshaft. The rotor is connected, secured against rotating, to the vacuum pump via a coupling. The vacuum pump comprises a housing which is flange-mounted to a cylinder head of the internal combustion engine, and a drive shaft which protrudes through the cylinder head and is connected, secured against rotating, to the rotor of the phase setter by means of the coupling. The vacuum pump is supplied with lubricating oil through a central bore of its drive shaft through the cylinder head.

SUMMARY OF THE INVENTION

It is an object of the invention to arrange a cam shaft phase setter and a vacuum pump for an internal combustion engine in such a way as to save space and weight and such that they can be easily mounted.

The invention proceeds from a device which comprises a phase setter for adjusting the phase position of a cam shaft of an internal combustion engine relative to a crankshaft, and a vacuum pump for supplying an assembly with a partial vacuum. The phase setter can be provided for adjusting the phase position of another cam shaft or as applicable of a plurality of other cam shafts of the internal combustion engine. The device can also comprise one or more other phase setters for adjusting the phase position of one or more other cam shafts. The vacuum pump can serve to supply a plurality of assemblies, or the device can comprise one or more other vacuum pumps for supplying the assembly or one or more other assemblies.

The device also comprises an attachment housing for the vacuum pump. The attachment housing can be or is already mounted on the internal combustion engine, i.e. the subject of the invention includes the device itself and the device when mounted. The attachment housing mounts a conveying member of the vacuum pump such that it can move and preferably forms a conveying chamber in which the conveying member is accommodated. It preferably comprises an inlet and an outlet. As applicable, the attachment housing also forms only an inlet or instead only an outlet for the fluid, preferably air, to be conveyed by means of the vacuum pump. The attachment housing can have one or more parts. In embodiments in which it preferably has a plurality of parts, it can for example comprise an attachment housing main part and one or more housing covers.

In accordance with the invention, the attachment housing also forms a housing or at least a housing cover for the phase setter and fulfils at least a housing function for the phase setter. The attachment housing can thus in particular mount at least one component of the phase setter or of a drive for the phase setter. One or more conduits for a pressure fluid, electrical energy or signals can extend within the attachment housing or on the outside of the attachment housing. The attachment housing can comprise an accommodating space for a control means, for example a control valve or an electrical control means, and as applicable an electrical motorised actuator for the phase setter.

The phase setter and vacuum pump are combined by means of the attachment housing to form one functional unit. To the extent to which the attachment housing of the vacuum pump takes on functions for the phase setter, the internal combustion engine itself is relieved of the functions in question. A structural part of the attachment housing which is required for the vacuum pump can also for example simultaneously form a structural part for the phase setter. This helps to reduce the weight and required installation space of the phase setter and vacuum pump, and to reduce the number of parts which are to be mounted in connection with the phase setter and the vacuum pump. This also simplifies the interface between the internal combustion engine on the one hand and the phase setter and vacuum pump on the other. The number of interfaces can be reduced, for example by driving the vacuum pump via the phase setter, such that it does not therefore have to be additionally connected to a drive.

In preferred embodiments, the phase setter comprises a first rotor and another, second rotor. When the internal combustion engine is in operation, the first rotor is driven at a rotational speed which is dependent on the rotational speed of a crankshaft of the internal combustion engine. The second rotor drives the cam shaft which is to be set with respect to its phase position. The second rotor is driven in accordance with the first rotor. The rotational angular position which the second rotor adopts relative to the first rotor during the rotational movement, i.e. the phase position, can be adjusted over a determined rotational angle adjusting range. The second rotor is preferably driven via the first rotor. In a preferred embodiment, the first rotor slaves the second rotor in its rotational movement and is correspondingly coupled to the second rotor for this purpose. The coupling is such that the relative adjusting rotational movement can be superposed on the rotational movement generated by the slaving. The coupling is preferably a fluidic-mechanical coupling. In principle, however, the phase position of the second rotor could also be electromagnetically adjusted and the adjustment of the phase position could be electronically controlled. In such embodiments, it would be possible to completely omit a mechanical coupling. The rotors can in particular be arranged with an internal axle with respect to each other and preferably such that they can rotate about the same rotational axis. An external-axle arrangement with preferably parallel rotational axes is however likewise conceivable. In principle, the phase setter could also be formed as an independent motor, for example an electric motor, and the first rotor could be replaced by a stator which cannot rotate relative to the attachment housing. In such embodiments, the second rotor would be driven relative to the stator at the rotational speed which is dependent on the rotational speed of the crankshaft, and the rotational adjusting movement would be superimposed on this base rotational speed for the purpose of setting the phase position.

In preferred embodiments, the attachment housing rotatably mounts at least one of the rotors, preferably both rotors. It can rotatably mount the first rotor or the second rotor directly by forming a rotary joint with the rotor in question or with a bearing element which is connected, rotationally fixed, to the rotor. Alternatively, the first rotor or the second rotor can also be rotatably supported on the attachment housing only indirectly, via an intermediate member, wherein the rotor in question forms a rotary joint with the intermediate member and the intermediate member forms another rotary joint with the attachment housing. The first rotor or the second rotor can also be rotatably mounted by the attachment housing via a plurality of intermediate members and a corresponding plurality of joints. In particular, one of the rotors can form the at least one intermediate member for the other rotor.

The word "or" is always used here as well as elsewhere in the sense of "and/or", i.e. it includes the meaning "either . . . or" and the meaning "both . . . and", respectively, unless only a content limited to one or other direction of meaning can necessarily follow from the respective context.

As regards the feature of rotary-mounting, it is possible in summary for either the first rotor only or the second rotor only or both the first rotor and the second rotor to be rotatably mounted directly or indirectly by the attachment housing, which also includes the case in which one of the rotors is directly supported on the attachment housing and the other is indirectly supported on the attachment housing via another rotary joint. Directly rotary-mounting is understood as being embodiments in which a hub which serves for rotary-mounting is formed in one piece by the respective rotor, as well as embodiments in which the respective rotor on the one hand and a shaft which forms the rotary joint with the attachment housing on the other are formed separately from each other and joined to each other, secured against rotating. If the phase setter can be fluidically adjusted, the second rotor can advantageously be fixed, secured against rotating, on a separately manufactured fluid distributor shaft which forms the only rotary joint for the second rotor with the attachment housing or is rotatably supported on the attachment housing via one or more other rotary joints.

If the internal combustion engine comprises at least two cam shafts, then in accordance with preferred embodiments, one of the rotors can be connected, secured against rotating, to one of the cam shafts. The other rotor can likewise be connectable, secured against rotating, to the other cam shaft or to one of the other cam shafts. More preferably, however, only one of the rotors can be connected, secured against rotating, to one of the cam shafts, while the other rotor is coupled to the other cam shaft or to one of the other cam shafts by means of gear members. In a first variant, the first rotor can be connected, secured against rotating, to one of the cam shafts, and the second rotor outputs onto the other cam shaft or, as applicable, onto one of the plurality of other cam shafts, namely onto the cam shaft to be adjusted with respect to its phase position. In a second variant, the second rotor is connected, secured against rotating, to the cam shaft to be adjusted, and the first rotor can be rotated relative to this cam shaft within the rotational angular range of adjustability. Such embodiments are in particular advantageous when the device comprises another phase setter for adjusting the phase position of the second cam shaft or of one of a plurality of other cam shafts. For the other phase setter, the same conditions with regard to the connection to the other cam shaft can advantageously prevail as for the first phase setter. The other phase setter advantageously exhibits one or more of the features disclosed with respect to the first phase setter. The other phase setter can in particular be arranged together with the first phase setter, in or on the attachment housing.

It is advantageous if the attachment housing mounts the first or second rotor, directly or via at least one intermediate member, in a position and orientation in which, when the attachment housing is mounted, said rotor can be mounted on the cam shaft, secured against rotating. In such embodiments, it is sufficient for mounting said rotor and preferably the entire phase setter to grip the attachment housing and to position and mount it, including the rotor in question or preferably the entire phase setter, on the internal combustion engine.

The first or second rotor can preferably be connected to the cam shaft by means of a positive-fit or frictional-fit connection, particularly preferably by means of a pressing connection. It is favourable for the pressing connection if the rotor—or a mounting part which is connected, secured against rotating, to the rotor—exhibits an oblique surface which is inclined relative to the rotational axis of the cam shaft, and the cam shaft exhibits a corresponding opposite surface, which when connected are pressed against each other in a pressing fit. The oblique surfaces of the cam shaft and of the rotor or mounting part can in particular be formed as an external or internal cone and pressed against each other by means of a force introduced along the rotational axis of the cam shaft.

Although, in preferred embodiments, at least one—preferably, exactly one—of the rotors is connected, secured against rotating, to the single cam shaft only or, as applicable, to one of a plurality of cam shafts of the internal combustion engine, it is also conceivable for none of the rotors to be connectable, secured against rotating, to a single cam shaft or, as applicable, to one of the plurality of cam shafts. Embodiments are thus perfectly possible in which the first rotor is not rotary-driven via the cam shaft or, preferably, the plurality of cam shafts, but rather directly by the crankshaft via gear members, and in which the second rotor also outputs onto the cam shaft to be adjusted via gear members. Also, if there is a plurality of cam shafts, the first rotor can also be driven by one of the cam shafts via gear members, and the second rotor can output onto the cam shaft to be adjusted via gear members.

The attachment housing can advantageously serve to rotary-mount a gear wheel, accommodate such a gear wheel, or accommodate or support another gear member, for example a toothed belt, a simple belt or a chain. The gear member which is rotatably mounted or otherwise supported or accommodated can in particular be an output wheel onto the vacuum pump or, as applicable, an output wheel from the vacuum pump onto the phase setter, an output wheel onto another cam shaft of the internal combustion engine or an output wheel for the rotary drive of the first rotor. It is also possible to drive the other cam shaft and to output from this cam shaft onto the first rotor of the phase setter. The more gear members, required for driving onto or outputting from the phase setter, are rotatably mounted or otherwise supported or accommodated by the attachment housing, i.e. mounted on or in the attachment housing, the simpler the configuration for integrating the phase setter and vacuum pump on the internal combustion engine.

In preferred embodiments, the vacuum pump is driven via, i.e. from the phase setter. If, as is preferred, the vacuum pump is a rotational pump comprising at least one rotatable conveying member, then one of the rotors can be connected, secured against rotating, to the conveying member. If they are arranged coaxially next to each other on the same rotational axis, then instead of being connected, rotationally fixed, one of the rotors of the phase setter can be mechanically coupled to the conveying member of the pump via a gear system, for example by means of a planetary gear system. External-axle gear systems are preferred. When coupled by means of an external-axle gear system, the rotational axes of the phase setter and the rotational axis of the vacuum pump, which is preferably formed as a rotational pump, differ. In this case, the rotational axes are expediently parallel to each other. External-axle spur wheel gear systems are preferred gear systems. In principle, however, the gear system can also be formed with an internal axle or by means of a traction means such as for example a toothed belt. By means of a gear system, the rotational speed of the rotor or stator can advantageously be geared up to a higher rotational speed of the conveying member. By gearing up the rotational speed of the rotor which outputs onto the pump, the pump can be realised with a smaller volume and a correspondingly smaller required installation space for the same conveying output. By gearing down the rotational speed, the frictional output and consequently the wear can be reduced.

The phase setter can be electrically or fluidically adjustable and/or operable. It can in particular be formed as a fluidic pivoting motor. Examples of pivoting motors are described in U.S. Pat. No. 2,861,557 and U.S. Pat. No. 4,858,572.

In the case of a fluidic phase setter, a pressure storage can be provided for the pressure fluid by means of which the phase position of the rotor is adjusted relative to the stator, in order to ensure a sufficient setting speed of the phase setter. If the phase setter is supplied with pressure fluid in accordance with a rotational speed of the internal combustion engine, preferably by means of a pump which is driven by the internal combustion engine, for example a lubricant pump for supplying the internal combustion engine with lubricant, then the pressure of such a pressure fluid supply can be subject to major fluctuations within the operating range of the internal combustion engine. The pressure storage ensures that the phase setter is supplied with a sufficient pressure and a sufficient amount of the pressure fluid, even under unfavourable conditions. The attachment housing advantageously accommodates the pressure storage, or as applicable only a part of the pressure storage or only one or more movable components of the pressure storage which serve to provide the pressure. The pressure storage can also be arranged in a housing of its own, which is mounted on a housing part of the attachment housing. In such embodiments, the attachment housing part and the mounted pressure storage housing are together understood as being the attachment housing or a part of the attachment housing. In preferred embodiments, however, the attachment housing forms both one or more mounting points for mounting on the internal combustion engine and at least one wall of the pressure storage, in one piece.

The pressure storage comprises a pressure chamber and a wall structure which delineates the pressure chamber and can be moved against a restoring elasticity force. The movable wall structure can be an elastically flexible but fluid-proof wall structure or preferably a piston which can be moved back and forth in the pressure chamber. In the former case, the wall structure can be fixed to the chamber wall. It can itself form a spring member which generates the restoring elasticity force. The pressure storage would be a membrane storage comprising an elastic or as applicable merely flexible membrane which is tensed by an additional spring member. In the other case, the piston is supported on a spring member. The spring member for the piston or the merely flexible wall structure can be formed by a gas pressure spring, but is preferably a mechanical spring, for example a spiral spring, which is tensed—preferably, pressurised—when the pressure in the chamber increases. The attachment housing preferably mounts the piston or supports the spring member; in one case, the wall structure which is elastic in its own right, and in the other, the gas pressure spring or mechanical spring.

A pressure storage for the phase setter is advantageous in principle and not only for the combination of the phase setter and vacuum pump or only in combination with the feature of integrating a phase setter and a vacuum pump in or on a common attachment housing. The combination of a phase setter for or on an internal combustion engine and a pressure storage for the pressure fluid serving to adjust the phase setter is therefore itself alone also a subject of the invention. Such a device for adjusting the phase position of a cam shaft relative to a crankshaft of an internal combustion engine comprises a phase setter for adjusting the phase position of the cam shaft and a pressure storage for ensuring a sufficient fluid pressure for the phase setter. The pressure storage also serves as a bolster or reservoir, by increasing the amount of fluid available for adjusting. The phase setter and the pressure storage advantageously exhibit one or more of the features disclosed here and can in particular correspond to one or more of the claims. Such a device can exhibit one or more of the features disclosed here in connection with the vacuum pump. Also, an attachment housing of the type described can in particular form the pressure storage or at least a wall of the pressure storage.

The pressure storage is preferably assigned to the phase setter only. If the device comprises a plurality of phase setters, each of these phase setters can be respectively provided with a pressure storage of its own, or a common pressure storage can be provided for the plurality of phase setters.

In preferred embodiments, the attachment housing comprises an attachment housing part and one or more covers fixed to the attachment housing part. The attachment housing part fulfils one or more of the functions required for operating the phase setter and the pump, for example mounting and fluid distribution. The attachment housing part is manufactured in one piece, i.e. is moulded in an original moulding method and preferably subsequently machined. The attachment housing can comprise a plurality of such housing parts, each of which fulfils at least one of the functions required for operating the device, such as for example mounting or fluid distribution. In preferred embodiments, the attachment housing consists of a single attachment housing part for fulfilling one or more functions required for operating the device and otherwise only of one or more housing covers for sealing off the attachment housing part against dirt or preferably fluid, or one or more internal or external chambers of the attachment housing part.

Instead of the cited functions of supporting, rotary-mounting or accommodating components or forming or supporting components of the pressure storage, the attachment housing can take on one or more other functions, for example distributing lubricating oil for the pump or a non-hydraulic phase setter or distributing the pressure fluid for a fluidic phase setter. More preferably, however, the attachment housing fulfils at least one of the functions already described and at least one of said other functions.

The pump is preferably lubricated with the lubricating oil for the internal combustion engine. With regard to the supply of lubricating oil, it may also be noted that in fluidic embodiments, the phase setter is preferably operated using the lubricating oil of the internal combustion engine as a pressure fluid and the same lubricating oil is also used to lubricate the vacuum pump.

If the phase setter is operated using the lubricating oil for the internal combustion engine, the lubricating oil can be fed from the cam shaft to the phase setter and the preferably provided pressure storage. Alternatively or additionally, the lubricating oil is fed in separately in preferred embodiments, preferably in or on the engine housing of the internal combustion engine. In advantageous embodiments, the attachment housing comprises a fluid port for the lubricating oil for connecting to the lubricating oil feed in question, in or on the engine housing of the internal combustion engine. If the phase setter is not operated using the lubricating oil of the internal combustion engine, or the vacuum pump is not lubricated with the lubricating oil, the attachment housing can still advantageously comprise a fluid port for feeding in another pressure fluid or lubricant.

In preferred embodiments, the phase setter is supplied with the pressure fluid via a reflux valve. If the vacuum pump is lubricated with the pressure fluid, both components are advantageously supplied with pressure fluid and/or lubricating oil via the same reflux valve. Alternatively, however, it is also possible to provide each of these two components with a reflux valve of its own. Instead of a simple reflux valve or, as applicable, a plurality of reflux valves, it is also in principle possible to provide a different blocking means, for example a sliding valve. The blocking means, preferably a reflux valve, or the plurality of blocking means is/are preferably assigned to the phase setter or the pump only, i.e. arranged in the flow of the respective fluid immediately upstream of the component in question or of one or more control means for the component in question, in order to ensure the greatest possible reliability of supply or the shortest possible response time. If a pressure storage is provided for the phase setter, the blocking means for the phase setter is preferably arranged upstream of the pressure storage. The combination of a phase setter and such a blocking means, preferably in combination with the pressure storage, is another independent subject of the invention. Both the pressure storage and the blocking means, preferably both components in combination, serves to ensure a sufficient fluid pressure, even in critical situations, for example at a low rotational speed of a pump serving to supply the fluid or when a fluid feed is significantly throttled by the internal combustion engine.

In one development, the device has a detection means for ascertaining the rotational angular position of the cam shaft to be adjusted. In preferred embodiments, the detection means comprises a rotational angle transmitter, preferably a transmitter wheel, and a sensor which is assigned to the transmitter and detects the position of the sensor. The transmitter is advantageously connected, secured against rotating, to the second rotor. If the latter outputs onto the cam shaft to be adjusted via gear wheels, the transmitter can also be connected, secured against rotating, to one of these gear wheels or fixedly connected to another type of gear member, for example a toothed belt. The sensor is preferably arranged in or on the attachment housing. The rotational angle transmitter comprises marks, for example optically or preferably tactilely detectable marks. Correspondingly, the sensor can for example be an optical sensor or preferably a tactile sensor. The rotational angle transmitter can in particular be formed as a transmitter wheel comprising at least one projecting protrusion, preferably a plurality of projecting protrusions distributed over the circumference, which is/are detected by the sensor.

In addition to the phase setter and the vacuum pump which is combined with the phase setter in or on a common attachment housing, the invention also relates to an internal combustion engine comprising the mounted unit. The first rotor of the phase setter is driven at a rotational speed which is proportional to the crankshaft of the internal combustion engine and in four-stroke engines is usually half the rotational speed of the crankshaft. In preferred embodiments, the first rotor is mechanically coupled to the crankshaft, i.e. it draws its drive from the crankshaft. The second rotor is preferably mounted, secured against rotating, on the cam shaft. The attachment housing is preferably mounted on the engine housing of the internal combustion engine, for example on a cylinder head. The internal combustion engine can in particular form the engine of a vehicle, preferably an automobile. The assembly to be supplied with a partial vacuum by the vacuum pump can in particular be a brake servo or other servo assembly of the vehicle.

BRIEF DESCRIPTION OF THE DRAWINGS

Example embodiments of the invention are explained below on the basis of figures. Features disclosed by the example embodiments, each individually and in any combination of features, advantageously develop the subjects of the claims as well as the embodiments described above. There is shown:

DETAILED DESCRIPTION OF THE PREFERRED EMBODIMENTS

Figure 1:
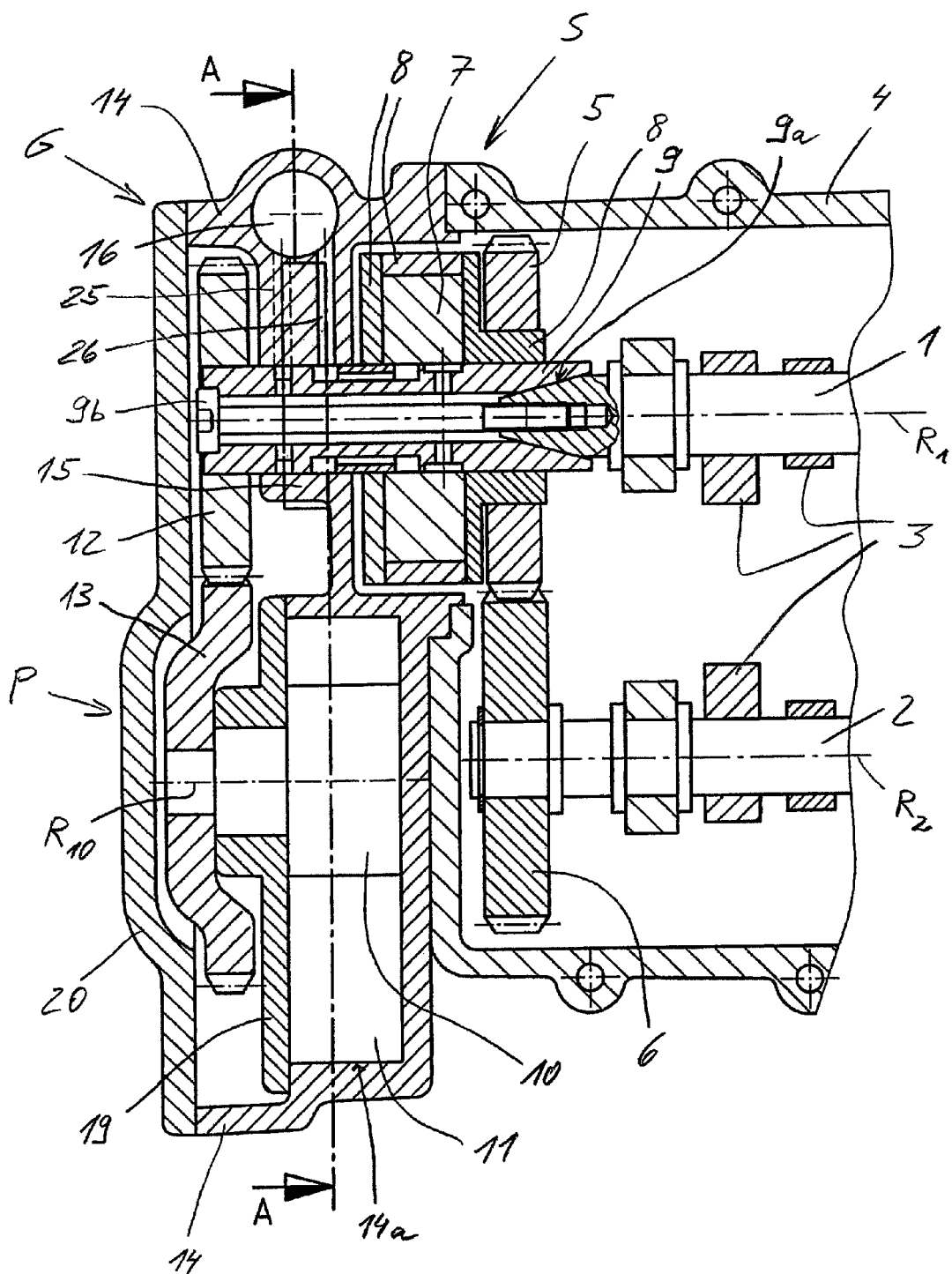
FIG. 1 a device of a first example embodiment, mounted on an internal combustion engine.

FIG. 1 shows a phase setter S and a vacuum pump P which are arranged on an internal combustion engine by means of a common attachment housing G. The internal combustion engine comprises two cam shafts 1 and 2 which are arranged next to each other and comprise cams 3, one of which serves to control inlet valves and the other of which serves to control outlet valves of the internal combustion engine. The cam shafts 1 and 2 are arranged in an engine housing 4—in the example embodiment, a cylinder head—of the internal combustion engine, such that they can rotate about their respective rotational axes $R_1$ and $R_2$. The cam shaft 1 is driven by a crankshaft of the internal combustion engine, for example via a drive wheel arranged at an end (not shown) of the cam shaft 1 facing away from the phase setter S.

The phase setter S comprises a gear wheel 5, via which it drives the cam shaft 2. The gear wheel 5 is an externally toothed spur wheel. It is in toothed engagement with another gear wheel 6 which is likewise formed as an externally toothed spur wheel. The gear wheel 6 is connected, secured against rotating, to the cam shaft 2. The cam shaft 1 is thus driven by the crankshaft in a non-variable phase position with respect to the crankshaft. By contrast, the phase position of the cam shaft 2 can be adjusted relative to the crankshaft and relative to the cam shaft 1 by means of the phase setter S. It is driven via the phase setter S.

The phase setter S comprises a first rotor 7 and a second rotor 8 which can be rotated about the rotational axis $R_1$ of the cam shaft 1 relative to each other over a predetermined rotational angle adjusting range. The first rotor 7 is connected, secured against rotating, to the cam shaft 1, and the second rotor 8 is connected, secured against rotating, to the gear wheel 5. When the crankshaft rotates, the first rotor 7 slaves the second rotor 8 in its rotational movement, wherein however the phase position of the second rotor 8 relative to the first rotor 7 can be adjusted within the rotational angle adjusting range. The phase position of the cam shaft 2 relative to the crankshaft corresponds to the phase position of the second rotor 8 relative to the first rotor 7.

The vacuum pump P is a rotational pump—in the example embodiment, a vane pump. It comprises a rotor 10 and a vane 11 which is guided by the rotor 10 such that it can move linearly; these form a conveying member 10, 11 of the pump P. The rotor 10 can rotate about a rotational axis $R_{10}$ which is spaced in parallel from the rotational axis $R_1$. The conveying member 10, 11 is rotary-driven by the crankshaft via the phase setter S. The rotary drive is provided by an external-axle toothed spur wheel gear system consisting of a gear wheel 12 which is connected, secured against rotating, to the first rotor 7 and a gear wheel 13 which is connected, secured against rotating, to the rotor 10 of the vacuum pump P. The gear wheels 12 and 13 are in toothed engagement with each other. The vacuum pump P is driven, geared down—i.e. at a lower rotational speed than the rotor 7 driving the pump P—via the external-axle spur wheel gear system formed by the gear wheels 12 and 13. Gearing down enables the frictional output and correspondingly the wear, as well as the noise of the pump P to be kept low. In equally preferred alternative embodiments, the gearing ratios can be reversed and the pump P can be driven at a higher rotational speed than the driving rotor 7, such that the size of the pump P can be reduced.

The conveying member 10, 11 is accommodated in a pump chamber which is formed by the attachment housing G. The attachment housing G substantially consists of an attachment housing part 14, which largely forms the wall of the pump chamber, an inner housing cover 19 which seals off the pump chamber, and an outer housing cover 20 which seals off the attachment housing part 14 from outside. The attachment housing G is fixed to the engine housing 4—in the example embodiment, the cylinder head. The fixation is provided by the attachment housing part 14 only, which for this purpose forms a connecting flange for a fixed and sealed fixation around the entire circumference of a lateral opening of the engine housing 4. On a low-pressure side, the attachment housing G comprises an inlet for the vacuum pump P for a fluid, preferably air, and on an outlet side, an outlet for the suctioned, pressure fluid. One or more assemblies, for example a brake servo (not shown), is/are connected to the inlet of the pump P and supplied with the partial vacuum.

The attachment housing G is closed with respect to the vacuum pump P itself, aside from the necessary ports, and is open towards the side of the internal combustion engine for the phase setter S. When mounted, it seals off the engine housing 4 against fluid, around the rotational axis $R_1$. The attachment housing G mounts the first rotor 7 in a position and orientation relative to its contact surface with the engine housing 4 such that the rotational axis $R_1$ of the rotor 7 is flush with the rotational axis $R_1$ of the cam shaft 1 when the attachment housing G is positioned, and the rotor 7 can correspondingly be connected, secured against rotating, to the cam shaft 1 and the attachment housing G to the engine housing 4. An assembler or preferably a mounting robot does not have to separately grip and position the phase setter S for mounting in particular the first rotor 7. Handling and positioning the phase setter S is integrated with handling and positioning the attachment housing G. The device thus forms a mounting unit. Mounting the attachment housing G simultaneously also mounts the pump P.

Because the phase setter S and the vacuum pump P are arranged next to each other and with an axial overlap, the device as a whole is advantageously flat. The part of the attachment housing G which accommodates the vacuum pump P is arranged next to the part of the attachment housing G which mounts the phase setter S and also surrounds it over at least a part of its axial length. The connecting flange of the attachment housing G and the part accommodating the vacuum pump P are correspondingly arranged next to each other. One wall of the attachment housing G is in contact with the engine housing 4 and abuts it next to the connecting flange. In a modification, the engine housing 4 could also form a wall of the part of the attachment housing G which accommodates the pump P—in the example embodiment, a wall of the pump chamber. With respect to sealing, however, it is more advantageous if the attachment housing G completely surrounds the pump chamber.

The attachment housing G—in the example embodiment, the attachment housing part 14—mounts the first rotor 7 of the phase setter S such that it can rotate about the rotational axis $R_1$ of the cam shaft 1. It forms a rotary joint—in the example embodiment, a rotary slide bearing—with a shaft 9 which is connected, secured against rotating, to the rotor 7. The attachment housing G forms a socket 15 of the rotary bearing. The shaft 9 protrudes through the socket 15. The first rotor 7 is arranged between the socket 15 and the cam shaft 1, and the gear wheel 12 is placed on the side of the socket 15 facing away from the cam shaft 1, at the end of the shaft 9 where it protrudes through the socket 15.

The shaft 9 extends the cam shaft 1 beyond its axial end. The cam shaft 1 and the shaft 9 are connected to each other by means of a pressing connection. For the pressing connection, the end of the cam shaft 1 exhibits an external cone and the shaft 9 exhibits a correspondingly shaped internal cone 9a. When mounted, the conical surfaces which are inclined with respect to the rotational axis $R_1$ are pressed axially onto and against each other by means of a central fixation screw 9b which protrudes through the hollow shaft 9 and is screwed to the cam shaft 1 in the axial direction.

The phase setter S can be fluidically adjusted. For adjusting, it is supplied—together with the internal combustion engine—with a pressure oil which is used as a lubricating oil for the internal combustion engine and as a pressure fluid for the phase setter S for adjusting the phase position. As regards mounting the first rotor 7, the rotor 7 and the shaft 9 could be formed in one piece. In a double function, however, the shaft 9 also fulfils the function of fluid distribution for the phase setter S, i.e. it serves as a fluid distributor shaft. Not least for consequent manufacturing reasons, it is formed separately from the rotor 7 and connected, secured against rotating, to the rotor 7.

The attachment housing G—in the example embodiment, the attachment housing part 14—not only serves to mount the phase setter S, i.e. to directly rotary-mount the first rotor 7 and to indirectly rotary-mount the second rotor 8 via the shaft 9 as an intermediate member, but also comprises control conduits in the form of integrated fluid channels for feeding and educing the pressure fluid for the phase setter. Of the fluid feeds and fluid eductions, two control conduits 25 and 26 and an accommodating space 16—in the example embodiment, a bore—can be seen in FIG. 1. The rotors 7 and 8 are charged with the pressure fluid via the accommodating space 16 and the control conduits 25 and 26, for adjusting the phase position.

Figure 2:
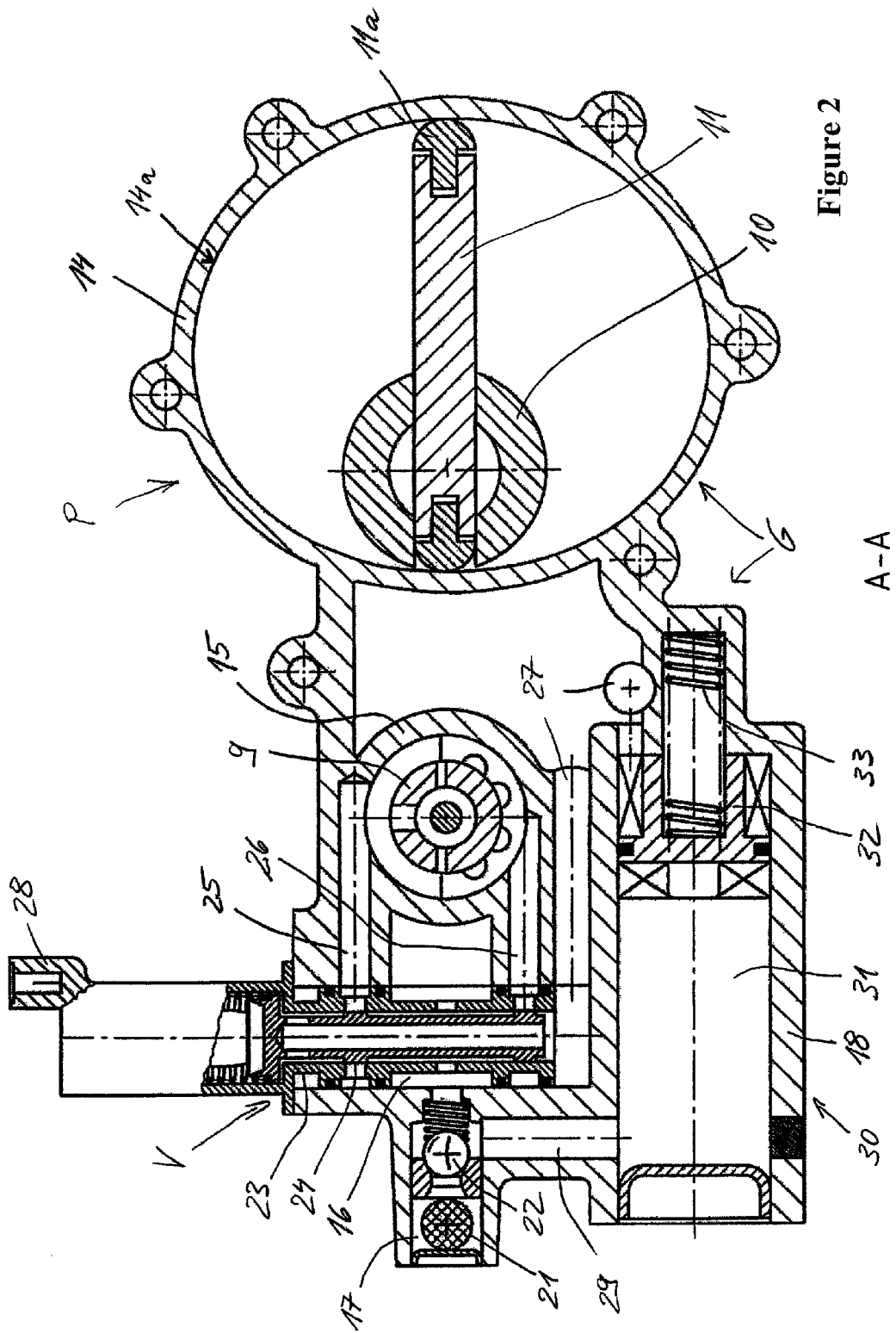
FIG. 2 the section A-A in FIG. 1.

FIG. 2 shows the device in the section A-A indicated in FIG. 1. It also shows components for charging the phase setter S with the pressure fluid, which are arranged outside the sectional plane of FIG. 1 and are not shown in FIG. 1. Among other things, the conveying member 10, 11 which is accommodated in the pump chamber formed by the attachment housing G can be seen. The attachment housing part 14 forms a cup-shaped part of the pump chamber, comprising a base (FIG. 1) facing the engine housing 4 and a side wall which circumferentially projects from the base and forms a running surface 14a for the conveying member 10, 11 on its inner surface area. As already mentioned, the conveying member 10, 11 comprises the rotor 10 which is mounted by the attachment housing G such that it can rotate about the rotational axis $R_{10}$, and the vane 11 which is guided by the rotor 10 such that it can move linearly transverse to the rotational axis $R_{10}$, and at both ends of which sliding elements 11a are arranged which slide along the running surface 14a when the conveying member 10, 11 is rotary-driven. The vane 11 divides the pump chamber into two chambers which are periodically increased and reduced in size, once for each revolution of the vane 11, and so suction the fluid at the inlet of the pump P and expel it through the outlet.

FIG. 2 also shows the two control conduits 25 and 26. In FIG. 2, the section A-A runs through the control channel 25 above the rotational axis $R_1$, and through the control channel 26 below the rotational axis $R_1$. As shown in FIG. 1, the control channels 25 and 26 are offset with respect to each other along the rotational axis $R_1$. The section A-A runs centrally through the accommodating space 16. The second rotor 8 is charged with the pressure fluid fed in through the control conduit 25 in one direction of its relative rotational mobility relative to the first rotor 7, and is charged with the pressure fluid fed in through the control conduit 26 in the other direction. The pressure fluid fed in through one of the control conduits 25 and 26 is channelled via a central hollow space, and the pressure fluid fed in through the other of the control conduits 25 and 26 is channelled through a peripheral channel of the shaft 9 between the rotors 7 and 8, such that the second rotor 8 is adjusted first in one rotational direction and then in the other relative to the first rotor 7.

A control means V—in the example embodiment, a control valve—comprising a valve cylinder 23 which cannot be moved relative to the attachment housing part 14, and a valve piston 24 which can be moved within the valve cylinder 23, is accommodated in the accommodating space 16. The control means V can in particular be embodied as a proportional valve or an on-off valve. The valve piston 24 can be moved axially back and forth between two end positions. FIG. 2 shows the valve piston 24 in a neutral position between the two end positions. In the neutral position, it closes both control openings of the valve cylinder 23, one of which is connected to the control conduit 25 and the other of which is connected to the control conduit 26. When it moves out of the neutral position in the direction of one of the end positions, one of the control conduits 25 and 26 is respectively connected to a high-pressure side of a pressure fluid supply via the control means V, while the other of the control conduits 25 and 26 is respectively separated from the high-pressure side. The pressure fluid flows off from the phase setter S through the control conduit 25 or 26 which is respectively separated from the high-pressure side of the pressure fluid supply, and is fed via a feedback conduit 27 to a low-pressure side of the pressure fluid supply. "28" designates a port via which the control means V is supplied with electrical energy and controlled by control signals.

The attachment housing part 14 forms another accommodating space 17 via which the device, when mounted, is connected to the pressure fluid supply for the phase setter S, wherein the pressure fluid is also used as the lubricant for the vacuum pump. The attachment housing G thus also forms a fluid port for the device at the other accommodating space 17. A connecting channel leads from the port into the accommodating space 17. A filter 21, preferably a sieve, is arranged in the connecting channel. The other accommodating space 17 is not shown in the section in FIG. 1; FIG. 1 also shows the accommodating space 16 without the control means V.

A blocking means 22—in the example embodiment, a reflux valve—is arranged between the port for the pressure fluid and the phase setter S, and secures the phase setter S against a drop in pressure in the pressure fluid supply. The reflux valve 22 is also arranged upstream of the control means V; in the example embodiment, it is arranged in the accommodating space 17. Thus, when the phase position is adjusted, the pressure fluid—once it has reached a minimum pressure burden predetermined by the reflux valve 22—flows via the port, the filter 21 and the reflux valve 22 to the control means V and from there to the phase setter S in accordance with the axial position of the valve piston 24.

In order to ensure a sufficient setting speed of the phase setter S if there are pressure fluctuations in the pressure fluid supply, the phase setter S is assigned a pressure storage 30. The pressure storage 30 is arranged upstream of the control means V and downstream of the reflux valve 22 in the pressure fluid cycle. Downstream of the reflux valve 22, more specifically downstream of a valve seat of the reflux valve 22, a connecting conduit 29 branches off to the pressure storage 30.

The attachment housing G—in the example embodiment, again the attachment housing part 14—forms a fixed wall 18 of a pressure chamber 31 of the pressure storage 30. The pressure chamber 31 is circular-cylindrical in the example embodiment, but could in principle also be cylindrical and exhibit a different cross-section. The pressure chamber 31 is closed, fluid-proof, on one side by a stopper or cover. Aside from this cover or stopper, the attachment housing part 14 forms all the fixed wall structures of the pressure chamber 31. A piston 32 is accommodated in the pressure chamber 31 such that it can move back and forth in the longitudinal direction of the cylinder. The piston forms a movable wall structure of the pressure chamber 31. A spring 33—in the example embodiment, a spiral spring—is also supported on the attachment housing part 14. The spring 33 is arranged, biased, between the attachment housing part 14 and the piston 32, and charges the piston 32 with its elasticity force in the direction of reducing the volume of the pressure chamber 31. The pressure storage 30 is configured, in terms of its chamber volume and spring tension, such that it is always ensured that the phase setter S performs at least one setting procedure at the high setting speed required. The pressure storage 30 is not shown in FIG. 1. It is arranged outside the sectional plane of FIG. 1 and would only be able to be seen in outline in FIG. 1.

Figure 3:
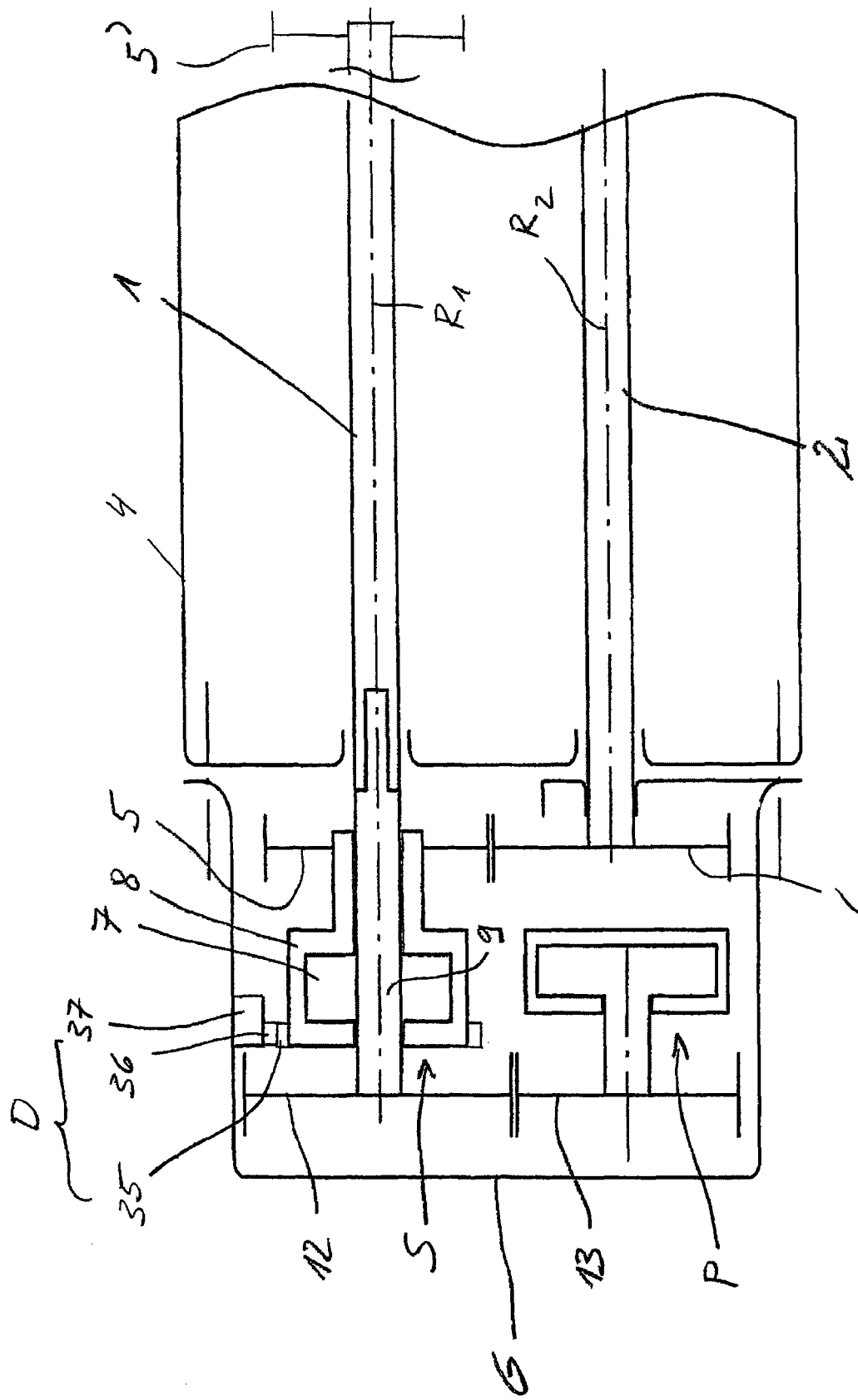
FIG. 3 the device of the first example embodiment, in a schematic representation.

FIG. 3 shows the internal combustion engine with the mounted device of the first example embodiment, in a schematic representation which facilitates comparison with alternative example embodiments. A drive wheel 5' is shown which is arranged at and connected, secured against rotating, to the other facing-side end of the cam shaft 1. The cam shaft 1 is driven by the crankshaft via the drive wheel 5'. Alternatively, the drive wheel 5' could also be arranged on the other side with the phase setter S, for example even on the cam shaft 1—to the right of the phase setter S in FIG. 3—or preferably at the end of the phase setter S facing away from the cam shaft 1, between the phase setter S and the gear wheel 12, or even more preferably also even on the side of the gear wheel 12 facing away from the phase setter S. In such embodiments, the shaft 9 (FIG. 1) is preferably guided out of the attachment housing G, and the drive wheel 5' is connected, secured against rotating, to the shaft 9 outside the attachment housing G. In another alternative variant, the gear wheel 5 can form the drive wheel for the cam shafts 1 and 2, the phase setter S and the vacuum pump P, by being in toothed engagement with another gear member which is driven by the crankshaft. In such an embodiment, the phase setter S would adjust the phase position of the cam shaft 1, while the cam shaft 2 would be driven in a fixed rotational speed relationship to the crankshaft. With regard to the prescribed terminology chosen here, the rotor 8 would be the first rotor and the rotor 7 would be the second rotor in such embodiments.

The device is also fitted with a detection means D for ascertaining the rotational angular position of the cam shaft to be adjusted—in the example embodiment, the cam shaft 2. The detection means D comprises a rotational angle transmitter 35, for example a transmitter wheel, which is arranged on the second rotor 8 of the phase setter S such that it is slaved in its rotational movement. In the example embodiment, the transmitter 35 is arranged on an outer circumferential surface of the rotor 8 and connected to it, secured against rotating, for the purpose of being slaved by the rotor 8. A sensor 36 is arranged facing opposite the transmitter 35. The sensor 36 can in particular be supported on the attachment housing G. The detection means D also includes an evaluation means 37 which is preferably likewise arranged in or on the attachment housing G and processes the signals from the sensor 36. The detection means D is part of a regulating means for setting the phase position of the rotor 8 and thus the cam shaft 2. A guiding variable which is dependent on the current operational status of the internal combustion engine is predetermined for the regulating means by a controller of the internal combustion engine. The output signal of the detection means D is inputted as a control variable. From the guiding variable and the control variable, the regulating means forms a setting variable for the phase setter S which is inputted to the control means V (FIG. 2). The setting variable is preferably inputted to the control means V via the port 28. Alternatively, the regulating means can also be arranged in or on the attachment housing G and the guiding variable of the higher-order controller of the internal combustion engine is inputted to the control means V via the port 28.

Figure 4:
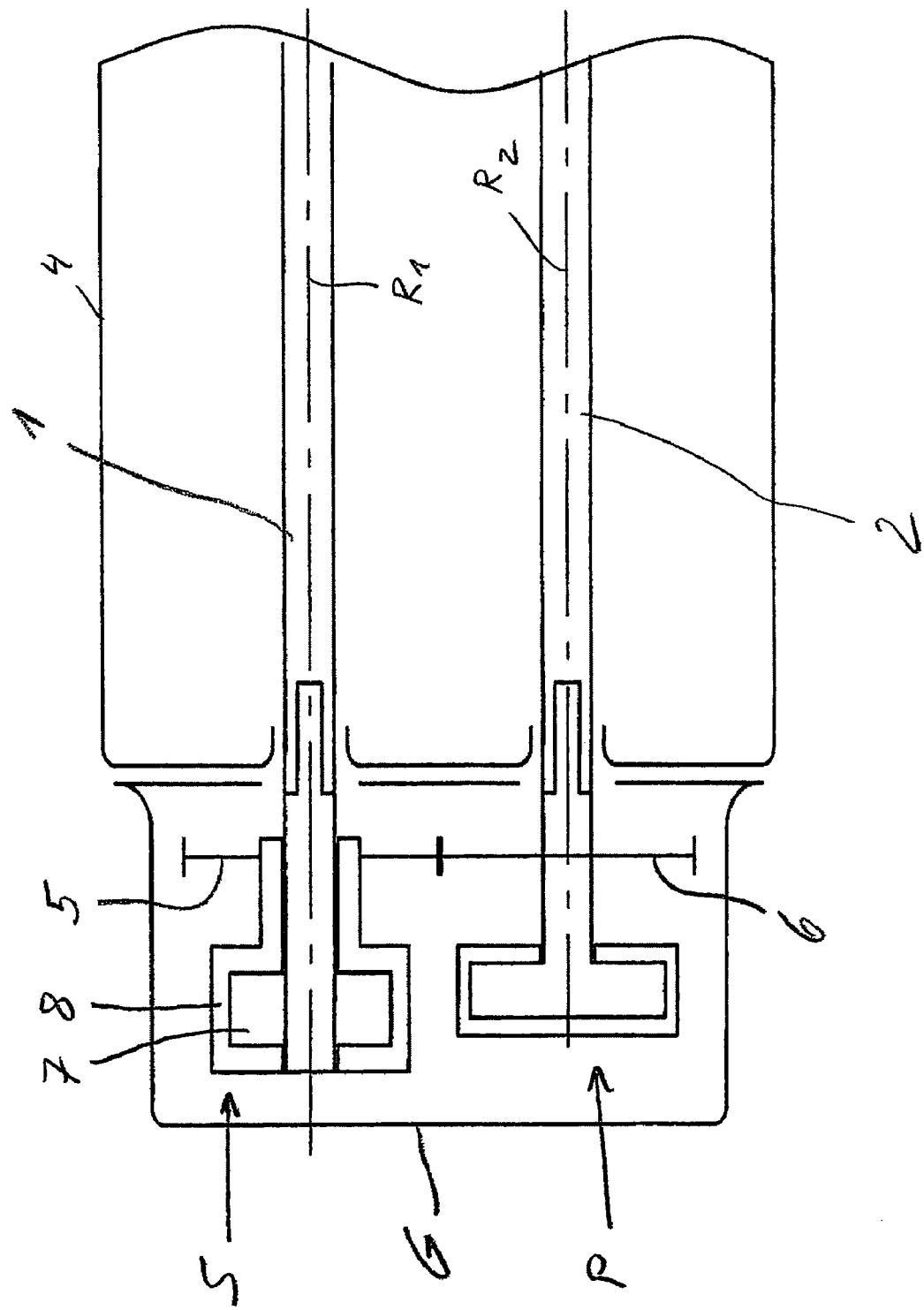
FIG. 4 a device of a second example embodiment.

FIG. 4 shows the internal combustion engine with a device of a second example embodiment mounted, in a schematic representation corresponding to FIG. 3. The second example embodiment differs from the first example embodiment only with regard to the drive for the vacuum pump P. In the second example embodiment, the conveying member 10, 11 of the vacuum pump is connected, secured against rotating, to the gear wheel 6 such that it is rotary-driven by the second rotor 8, rotationally fixed to the gear wheel 6 and the cam shaft 2. The gear wheels 12 and 13 are omitted. The statements made with respect to the drive variants of the first example embodiment also apply to the second example embodiment.

Figure 5:
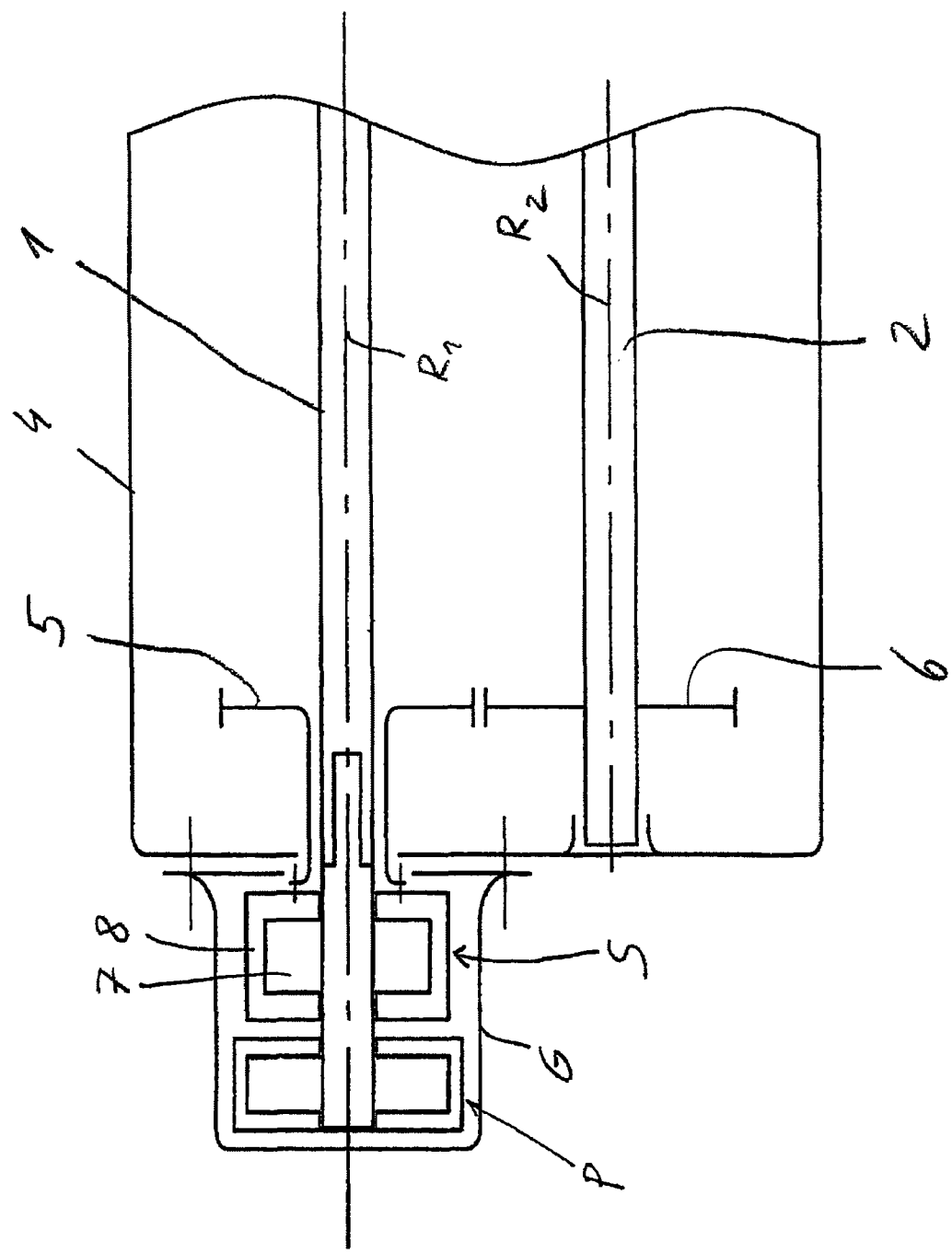
FIG. 5 a device of a third example embodiment.

FIG. 5 shows a mounted device of a third example embodiment. The phase setter S and the rotatable conveying member 10, 11 of the vacuum pump P are arranged, axially offset with respect to each other, along the rotational axis $R_1$ of the cam shaft 1. The rotor 7 is again connected, secured against rotating, to the cam shaft 1, and the rotor 8 to the gear wheel 5. The vacuum pump P is arranged on the side of the phase setter S facing away from the cam shaft 1. The rotor 10 of the vacuum pump P is connected, secured against rotating, to the first rotor 7 of the phase setter S. The rotor 7 is thus driven by the crankshaft via the cam shaft 1, and when rotated, slaves the rotor 8 in accordance with the relative phase position of the rotor 7 and the rotor 8. The phase setter S and the vacuum pump P are arranged in the same attachment housing G, which is correspondingly extended as compared to the first and second example embodiments in order to coaxially arrange the phase setter S and the vacuum pump P. As in the first example embodiment, the vacuum pump P is removed from the flow of force by the flow of force branching on an output side of the phase setter S, to the cam shaft 2 via the rotor 8 in one direction and to the vacuum pump P in the other direction.

Figure 6:
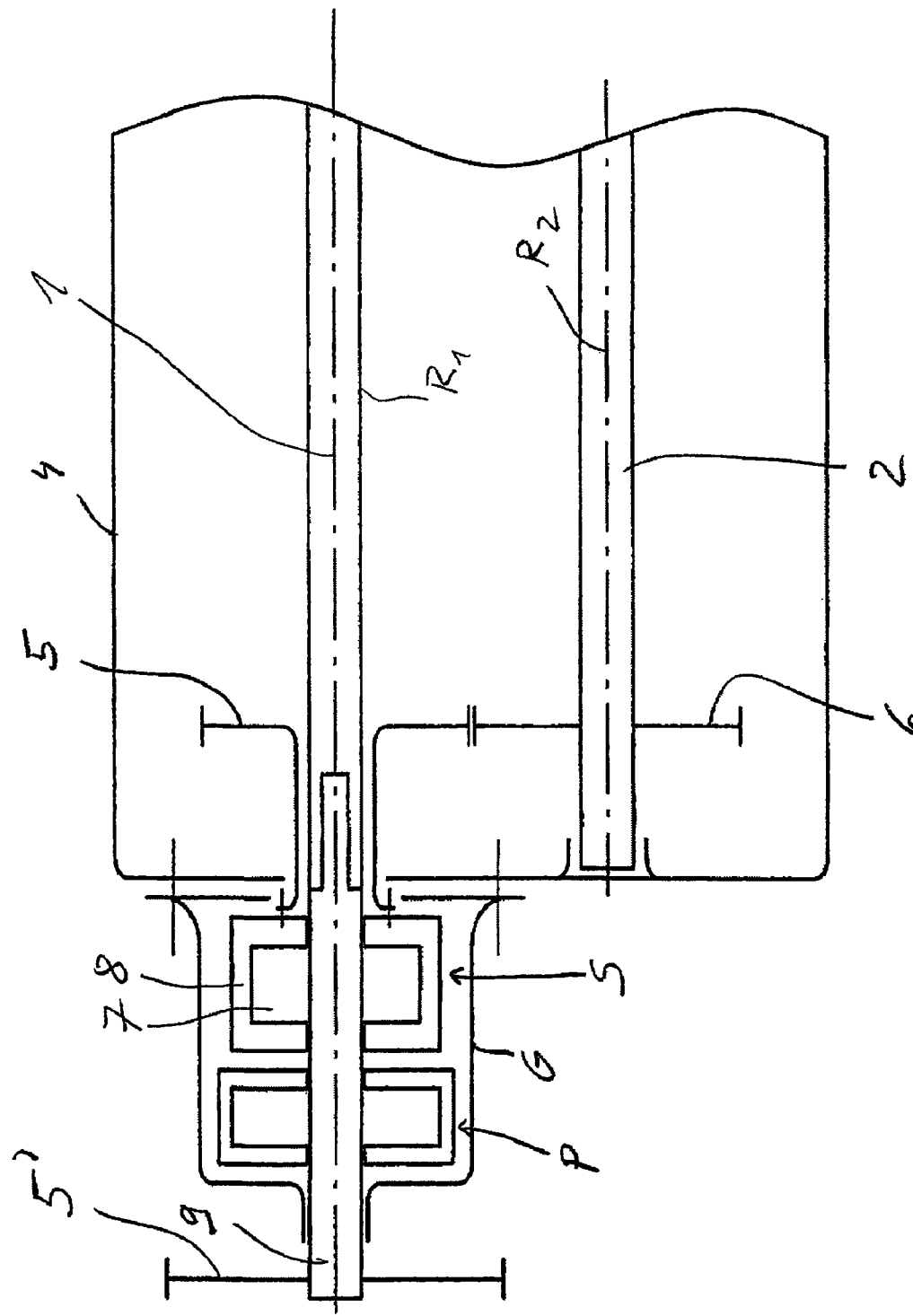
FIG. 6 a device of a fourth example embodiment.

FIG. 6 shows the mounted device in a fourth example embodiment which differs from the third example embodiment in that the cam shaft 1 is rotary-driven via the phase setter S, by arranging a drive wheel 5', which is coupled to the crankshaft, on the same facing side of the cam shaft 1 as the device, as described as a variant of the first example embodiment. The shaft 9 which is connected, secured against rotating, to the cam shaft 1 protrudes through the attachment housing G on the side of the device facing away from the cam shaft 1, such that the drive wheel 5' can be arranged on the shaft 9, outside the attachment housing G.

Figure 7:
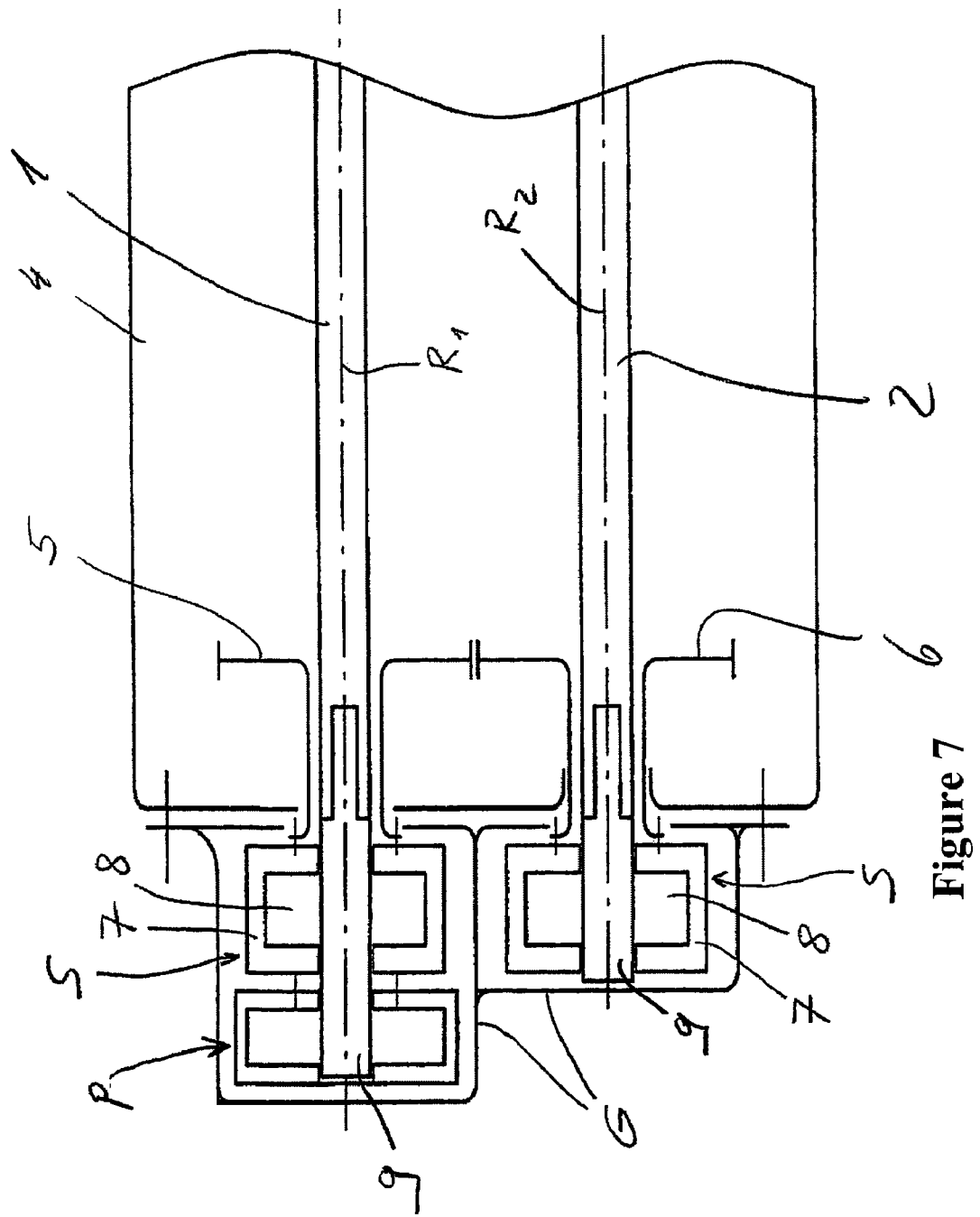
FIG. 7 a device of a fifth example embodiment.

FIG. 7 shows a mounted device in a fifth example embodiment. The device comprises two phase setters S mounted by an enlarged attachment housing G, namely one phase setter S for the cam shaft 1 and another phase setter S for the cam shaft 2. The second rotor 8 of one phase setter S is connected, secured against rotating, to the cam shaft 1, and the second rotor 8 of the other phase setter S is connected, secured against rotating, to the cam shaft 2. The first rotors 7 of the two phase setters S are each connected, secured against rotating, to a gear wheel—one to the gear wheel 5 and the other to the other gear wheel 6. One of the gear wheels 5 and 6 is driven by the crankshaft and outputs onto the other of the cam shafts 1 and 2 via the respectively assigned phase setter S. If, for example, the cam shaft 1 is arranged nearer to the crankshaft in the drive chain, the crankshaft 1 drives the rotor 7 of the assigned phase setter S via the gear wheel 5, which drives the rotor 8 of the same phase setter S, and the rotor 8 drives the cam shaft 1 to be adjusted. The gear wheel 5 also outputs onto the gear wheel 6. The gear wheel 6 outputs onto the rotor 8 via the first rotor 7 of the other phase setter S, the rotor 8 being connected, secured against rotating, to the cam shaft 2. As in the third and fourth example embodiments, one of the phase setters S is arranged, together with the vacuum pump P, along the rotational axis $R_1$. Its second rotor 7 is connected, secured against rotating, to the conveying member 10, 11, i.e. to the rotor 10 of the vacuum pump P. The attachment housing G—preferably an attachment housing part 14 moulded in one piece—mounts each of the second rotors 7 directly and the first rotors 8 indirectly via a shaft 9, respectively.

Where no statements have been made with respect to the second, third, fourth and fifth example embodiments, the statements made with respect to the first example embodiment apply.

What is claimed:

1. A device for adjusting the phase position of a cam shaft of an internal combustion engine and for supplying an assembly with a partial vacuum, said device comprising:
    a phase setter for adjusting the phase position of the cam shaft relative to a crankshaft of the internal combustion engine;
    a vacuum pump for the assembly; and
    an attachment housing for the vacuum pump, wherein the attachment housing is mounted on an engine housing of the internal combustion engine; and forms a housing or at least a housing cover for the phase setter.

2. The device according to claim 1, wherein the phase setter comprises a first rotor for a drive which is dependent on the rotational speed of the crankshaft, and a second rotor for an output onto the cam shaft, and the attachment housing rotatably mounts at least one of the rotors directly or via at least one intermediate member.

3. The device according to claim 2, wherein the attachment housing rotatably mounts one of the rotors directly and rotatably mounts the other via at least one intermediate member.

4. The device according to claim 1, wherein the phase setter comprises a rotor, and the attachment housing mounts said rotor, directly or via at least one intermediate member, in a position and orientation in which, when the attachment housing is mounted, said rotor is configured to be mounted on the cam shaft or on another cam shaft of the internal combustion engine, secured against rotating.

5. The device according to claim 2, wherein one of the rotors is configured to be connected to the cam shaft by means of a pressing connection.

6. The device according to claim 1, wherein the internal combustion engine comprises another cam shaft, one of the cam shafts is driven at an axial end, and the phase setter is configured to be mounted at the other axial end by one of the cam shafts.

7. The device according to claim 1, wherein the phase setter and the vacuum pump are coupled to each other, and the phase setter drives the vacuum pump or the vacuum pump drives the phase setter.

8. The device according to claim 1, wherein the phase setter comprises a drive side on which a torque can be introduced which drives the phase setter, and on an output side of the phase setter from which a flow of force is branched into a first output and a second output, and in that the cam shaft to be adjusted is driven via the first output, and the vacuum pump is driven via the second output.

9. The device according to claim 1, wherein the phase setter comprises a first rotor for a drive which is dependent on the rotational speed of the crankshaft, and a second rotor for an output onto the cam shaft, and the attachment housing rotatably mounts a gear wheel, via which the cam shaft can be driven by one of the rotors or via which one of the rotors can be driven, directly or via at least one intermediate member.

10. The device according to claim 1, wherein the phase setter and the vacuum pump are coupled to each other by means of gear members, and the phase setter drives the vacuum pump or the vacuum pump drives the phase setter via the gear members.

11. The device according to claim 10, wherein the phase setter comprises a first rotor for a drive which is dependent on the rotational speed of the crankshaft, and a second rotor for an output onto the cam shaft, and the gear members couple one of the rotors to the vacuum pump.

12. The device according to claim 10, wherein the gear members comprise traction means which is based on a frictional or positive fit, toothed gear wheels, or a combination thereof.

13. The device according to claim 10, wherein at least one of the gear members is arranged in or on the attachment housing.

14. The device according to claim 1, wherein a rotor of the phase setter is arranged such that it rotates about a first rotational axis and a conveying member of the vacuum pump is arranged such that it rotates about another, second rotational axis which is spaced in parallel from the first rotational axis.

15. The device according to claim 1, wherein a rotor of the phase setter and a conveying member of the vacuum pump are arranged such that they rotate about a common rotational axis.

16. The device according to claim 15, wherein the conveying member is connected or coupled by means of gear members, secured against rotating, to the rotor.

17. The device according to claim 1, wherein the phase setter hydraulically, pneumatically or electrically adjustable.

18. The device according to claim 1, wherein the phase setter is adjustable using a pressure fluid, and a pressure storage is provided for the pressure fluid, in order to ensure a sufficiently high setting speed of the phase setter.

19. The device according to claim 18, wherein the pressure storage comprises a pressure chamber which is delineated by a wall structure which can be moved against a restoring elasticity force and is supported by the attachment housing or mounted such that it can move back and forth.

20. The device according to claim 19, wherein a spring which generates the elasticity force is supported on the attachment housing.

21. The device according to claim 1, wherein the phase setter is adjustable using a pressure fluid and can be supplied with the pressure fluid by the attachment housing.

22. The device according to claim 1, wherein the phase setter is adjustable using a pressure fluid, and a blocking means is arranged in a feed of the pressure fluid in the attachment housing.

23. The device according to claim 22, wherein the blocking means is arranged upstream of a pressure storage.

24. The device according to claim 1, wherein the attachment housing comprises a fluid port for connecting to a fluid feed in or on an engine housing of the internal combustion engine.

25. The device according to claim 1, wherein the phase setter comprises a first rotor and a second rotor, and a rotational angular position which the rotors exhibit relative to each other can be adjusted, and in that a control means for adjusting the rotational angular position is arranged in an accommodating space of the attachment housing.

26. The device according to claim 1, wherein the internal combustion engine comprises a first and a second cam shaft, the phase setter is provided for adjusting the phase position of the first cam shaft, and the device comprises another phase setter for adjusting the phase position of the second cam shaft, wherein the attachment housing preferably also forms a housing or at least a housing cover for the other phase setter.

27. The device according to claim 1, comprising a detection means for ascertaining a rotational angular position of the cam shaft to be adjusted, wherein the detection means is arranged in or on the attachment housing.

28. The device according to claim 27, wherein the detection means comprises a rotational angle transmitter and a sensor for detecting the rotational angular position of the rotational angle transmitter, wherein the rotational angle transmitter is arranged on a rotor of the phase setter, and the sensor is arranged in or on the attachment housing.

29. An internal combustion engine, comprising: a crankshaft; a cam shaft; and a device according to claim 1, mounted on the internal combustion engine, for adjusting the phase position of the cam shaft relative to the crankshaft and for supplying an assembly with a partial vacuum.

30. The internal combustion engine according to claim 29, wherein the attachment housing is mounted on a cylinder head of the internal combustion engine.

31. The device according to claim 1, wherein the internal combustion engine comprises at least two cam shafts which are coupled to each other by means of gear members for a common drive, and the attachment housing mounts at least one of the gear members directly or via at least one intermediate member.

32. The device according to claim 1, wherein the vacuum pump is driven via gear members at a higher or lower rotational speed than the phase setter.

33. The device according to claim 1, wherein the phase setter and the vacuum pump are arranged next to each other and with an at least partial axial overlap.

34. The device according to claim 18, wherein the attachment housing forms a wall of the pressure storage.

35. The device according to claim 19, wherein a piston forms the movable wall structure.

36. The device according to claim 1, wherein the vacuum pump is configured to be supplied with lubricating oil by the attachment housing.

37. The device according to claim 1, wherein the phase setter is adjustable using a pressure fluid and is supplied with the pressure fluid via an engine housing of the internal combustion engine or the cam shaft or another cam shaft of the internal combustion engine.

38. The device according to claim 1, wherein the phase setter is adjustable using a pressure fluid, and at least one control conduit feeds through the attachment housing in order to charge the phase setter with the pressure fluid.

39. The device according to claim 22, wherein the blocking means is provided for the phase setter only or for the phase setter and the vacuum pump only.

40. The device according to claim 1, wherein a filter is arranged in a pressure fluid supply for the phase setter in or on the attachment housing.

* * * * *

UNITED STATES PATENT AND TRADEMARK OFFICE
CERTIFICATE OF CORRECTION

PATENT NO. : 8,061,317 B2
APPLICATION NO. : 12/109729
DATED : November 22, 2011
INVENTOR(S) : Bohner et al.

Page 1 of 1

It is certified that error appears in the above-identified patent and that said Letters Patent is hereby corrected as shown below:

Title Page, Insert

-- [30] Foreign Application Priority Data

April 27, 2007    (DE)...............102007020431.2 --

Signed and Sealed this
Third Day of July, 2012

David J. Kappos
*Director of the United States Patent and Trademark Office*